United States Patent
Jiang et al.

(10) Patent No.: US 12,195,036 B2
(45) Date of Patent: Jan. 14, 2025

(54) DYNAMIC SCENARIO PARAMETERS FOR AN AUTONOMOUS DRIVING VEHICLE

(71) Applicant: Baidu USA LLC, Sunnyvale, CA (US)

(72) Inventors: Shu Jiang, Sunnyvale, CA (US); Szu Hao Wu, Sunnyvale, CA (US); Yu Cao, Sunnyvale, CA (US); Weiman Lin, Sunnyvale, CA (US); Jiangtao Hu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 226 days.

(21) Appl. No.: 17/805,000

(22) Filed: Jun. 1, 2022

(65) Prior Publication Data

US 2023/0391356 A1 Dec. 7, 2023

(51) Int. Cl.
| | |
|---|---|
| B60W 60/00 | (2020.01) |
| G06V 20/56 | (2022.01) |
| G06V 20/58 | (2022.01) |
| G06F 18/214 | (2023.01) |

(52) U.S. Cl.
CPC ......... *B60W 60/001* (2020.02); *G06V 20/582* (2022.01); *G06V 20/588* (2022.01); *B60W 2420/403* (2013.01); *B60W 2554/4041* (2020.02); *G06F 18/2148* (2023.01)

(58) Field of Classification Search
CPC ......... B60W 60/001; B60W 2420/403; B60W 2554/4041; G06V 20/582; G06V 20/588; G06F 18/2148
See application file for complete search history.

(56) References Cited

U.S. PATENT DOCUMENTS

| | | | | |
|---|---|---|---|---|
| 10,627,521 | B2* | 4/2020 | England | G01S 17/931 |
| 11,550,851 | B1* | 1/2023 | Kabzan | G06N 20/00 |
| 2019/0033085 | A1* | 1/2019 | Ogale | G01C 21/3446 |
| 2019/0378035 | A1* | 12/2019 | Zhang | G06V 20/56 |
| 2020/0117205 | A1* | 4/2020 | Ha | B60W 60/001 |
| 2021/0009156 | A1* | 1/2021 | Hu | G06V 20/56 |
| 2021/0129868 | A1* | 5/2021 | Nehmadi | G01C 21/26 |
| 2021/0406262 | A1* | 12/2021 | Unnikrishnan | G06F 16/248 |

(Continued)

FOREIGN PATENT DOCUMENTS

| | | | | |
|---|---|---|---|---|
| DE | 102022107845 | A1 * | 10/2023 | |
| WO | WO-2018132607 | A2 * | 7/2018 | B60W 30/09 |
| WO | WO-2023057169 | A1 * | 4/2023 | G06V 10/82 |

OTHER PUBLICATIONS

DE 10 2022 107 845 A1—Machine translation (Year: 2022).*
WO 2023/057169 A1—machine translation (Year: 2023).*

*Primary Examiner* — Dino Kujundzic
(74) *Attorney, Agent, or Firm* — WOMBLE BOND DICKINSON (US) LLP

(57) ABSTRACT

According to some embodiments, systems, methods and media for dynamically generating scenario parameters for an autonomous driving vehicles (ADV) are described. In one embodiment, when an ADV enters a driving scenario, the ADV can invoke a map-based scenario checker to determine the type of scenario, and invokes a corresponding neural network model to generate a set of parameters for the scenario based on real-time environmental conditions (e.g., traffics) and vehicle status information (e.g., speed). The set of scenario parameters can be a set of extra constraints for configuring the ADV to drive in a driving mode corresponding to the scenario.

20 Claims, 9 Drawing Sheets

(56) References Cited

U.S. PATENT DOCUMENTS

| | | | |
|---|---|---|---|
| 2022/0274627 A1* | 9/2022 | Fairley | G06N 20/00 |
| 2023/0222268 A1* | 7/2023 | Muehlenstaedt | G05D 1/0217 |
| | | | 703/1 |
| 2023/0256991 A1* | 8/2023 | Johnson | B60W 60/001 |
| 2023/0347925 A1* | 11/2023 | Stonier | G06F 18/214 |

* cited by examiner

DYNAMIC SCENARIO PARAMETERS FOR AN AUTONOMOUS DRIVING VEHICLE

TECHNICAL FIELD

Embodiments of the present disclosure relate generally to operating autonomous vehicles. More particularly, embodiments of the disclosure relate to dynamically generating scenario parameters based on real-time environmental data and real-time vehicle status information.

BACKGROUND

An autonomous driving vehicle (ADV), when driving in an automatic mode, can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

When driving on a road segment, the ADV may encounter various driving scenarios, such as a left turn, a right turn, a junction, and a straight lane. Each of the driving scenarios (also referred to as a scenario) may require the ADV to drive differently based on the particularities of the driving situations. For example, navigating a junction may require the ADV to consider more information than navigating within a straight lane, because both road conditions and traffics at the junction may be more complicated than those within the straight lane. Thus, the ADV can use different parameters (e.g., when to slow down, when to speed up, etc.) as additional constraints to generate trajectories to navigate the different scenarios.

However, using the same set of fixed parameters for the same type of scenarios regardless of the locations of the scenarios or the times when an ADV enters the scenarios may not be efficient. For example, a junction on one road may have different environmental conditions from a junction on another road. Further, the same scenario on the same road may also have different environmental conditions during different time periods of the day. For example, the traffic may be heavier during rush hours than non-rush hours.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
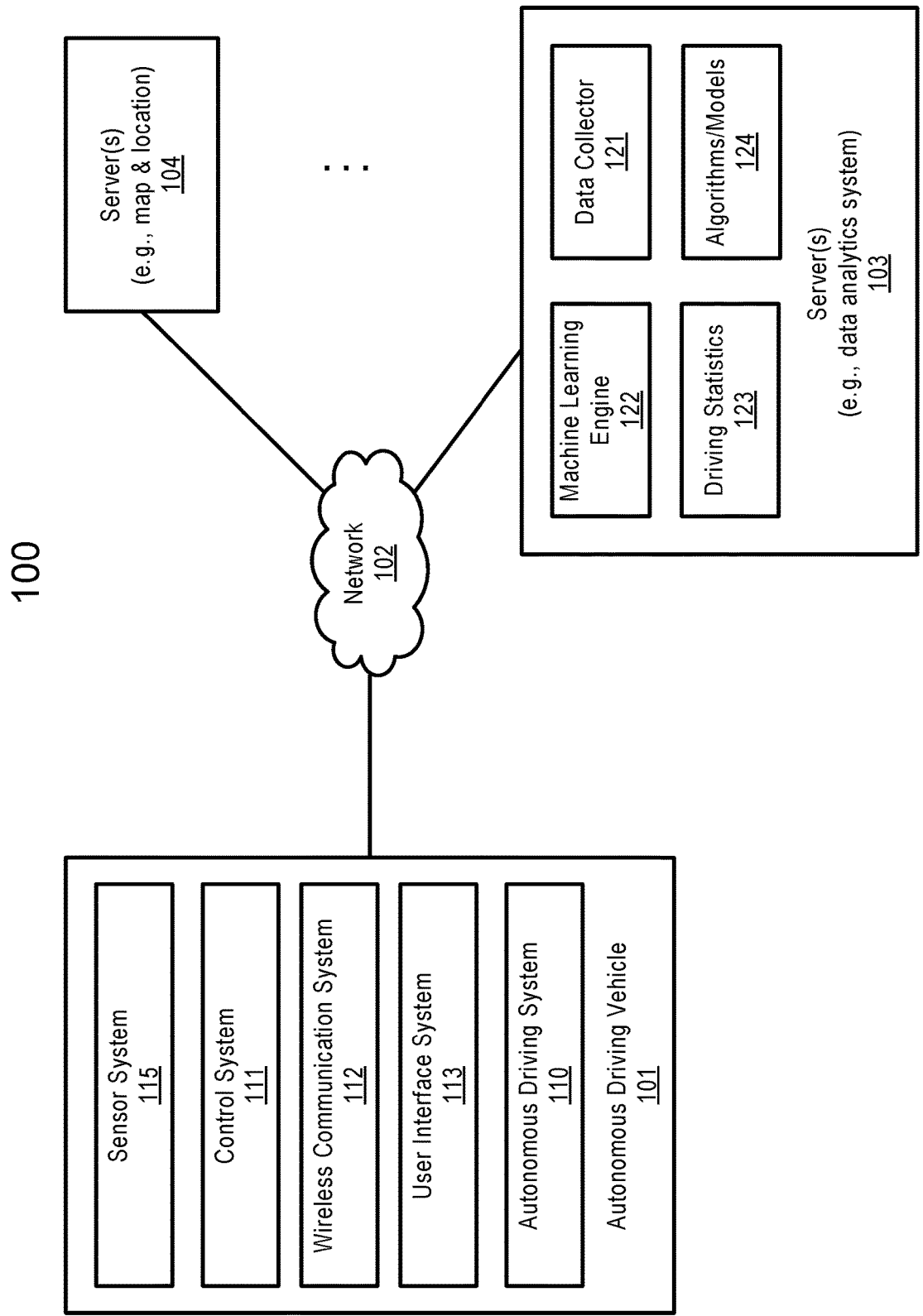
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, systems, methods and media for dynamically generating scenario parameters for an autonomous driving vehicles (ADV) are described. In one embodiment, when an ADV enters a driving scenario, the ADV can invoke a map-based scenario checker to determine the type of scenario, and invokes a corresponding neural network model to generate a set of parameters for the scenario based on real-time environmental conditions (e.g., traffics) and vehicle status information (e.g., speed). The set of scenario parameters can be a set of extra constraints for configuring the ADV to drive in a driving mode corresponding to the scenario.

In one embodiment, the scenario checker can determine the type of scenario that the ADV has entered based on a current position of the ADV, information on a map surrounding the current position, information of a route that the ADV is taking, and one or more of a set of fixed parameters for the scenario. The set of fixed parameters for the scenario are generated by the trained neural network model based historical environmental data and historical vehicle status information.

In one embodiment, the environmental data at the scenario includes traffics at the scenario, and the vehicle status information of the ADV includes the speed of the ADV.

In one embodiment, the set of scenario parameters represent a set of additional constraints that are used by the ADV when generating a planned trajectory, and reflect human-like driving behaviors for navigating scenario. Thus, based on the different environments of the scenario and the time when the ADV enters the scenario, the set of scenario parameters can be different.

In one embodiment, the scenario is one of many scenarios that are predefined based on map information. The plurality of scenarios can include a junction, a yield sign, a stop sign, a one-lane right turn, a one-lane left turn, a multi-lane right turn, and a multi-lane left turn.

The embodiments described above are not exhaustive of all aspects of the present invention. It is contemplated that the invention includes all embodiments that can be practiced from all suitable combinations of the various embodiments summarized above, and also those disclosed below.

Autonomous Driving Vehicle

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
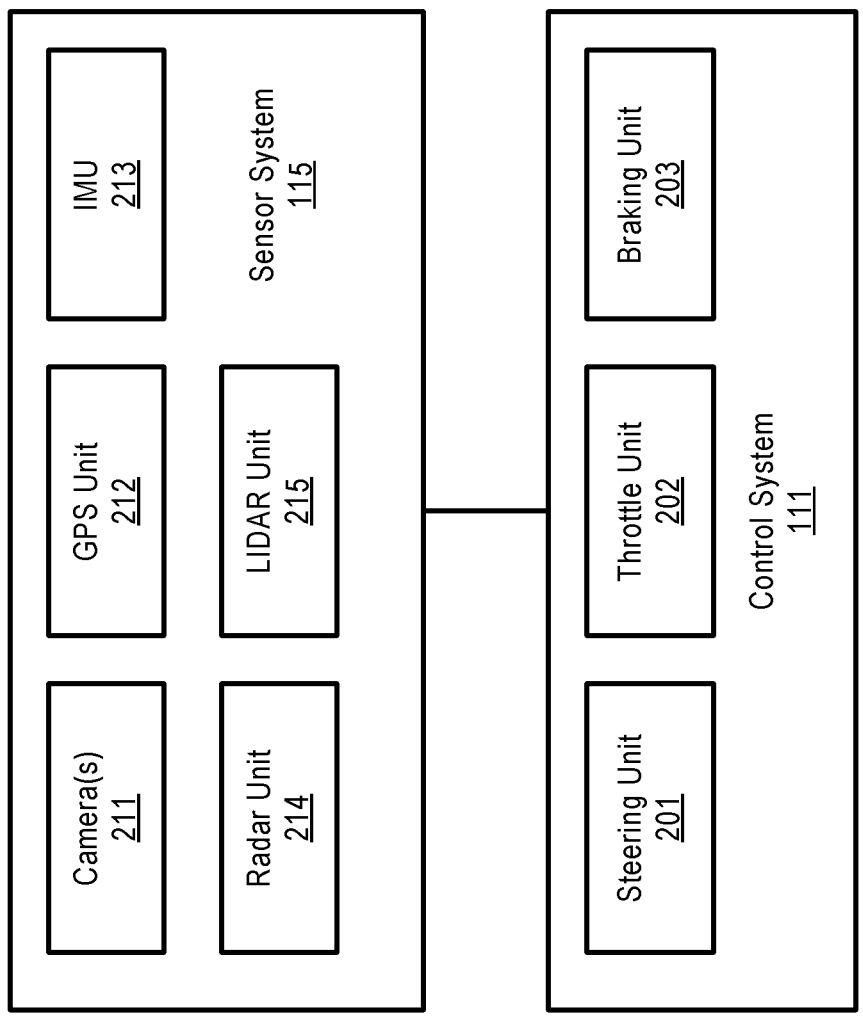
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 can then be uploaded on ADVs to be utilized during autonomous driving in real-time.

Figure 3A:
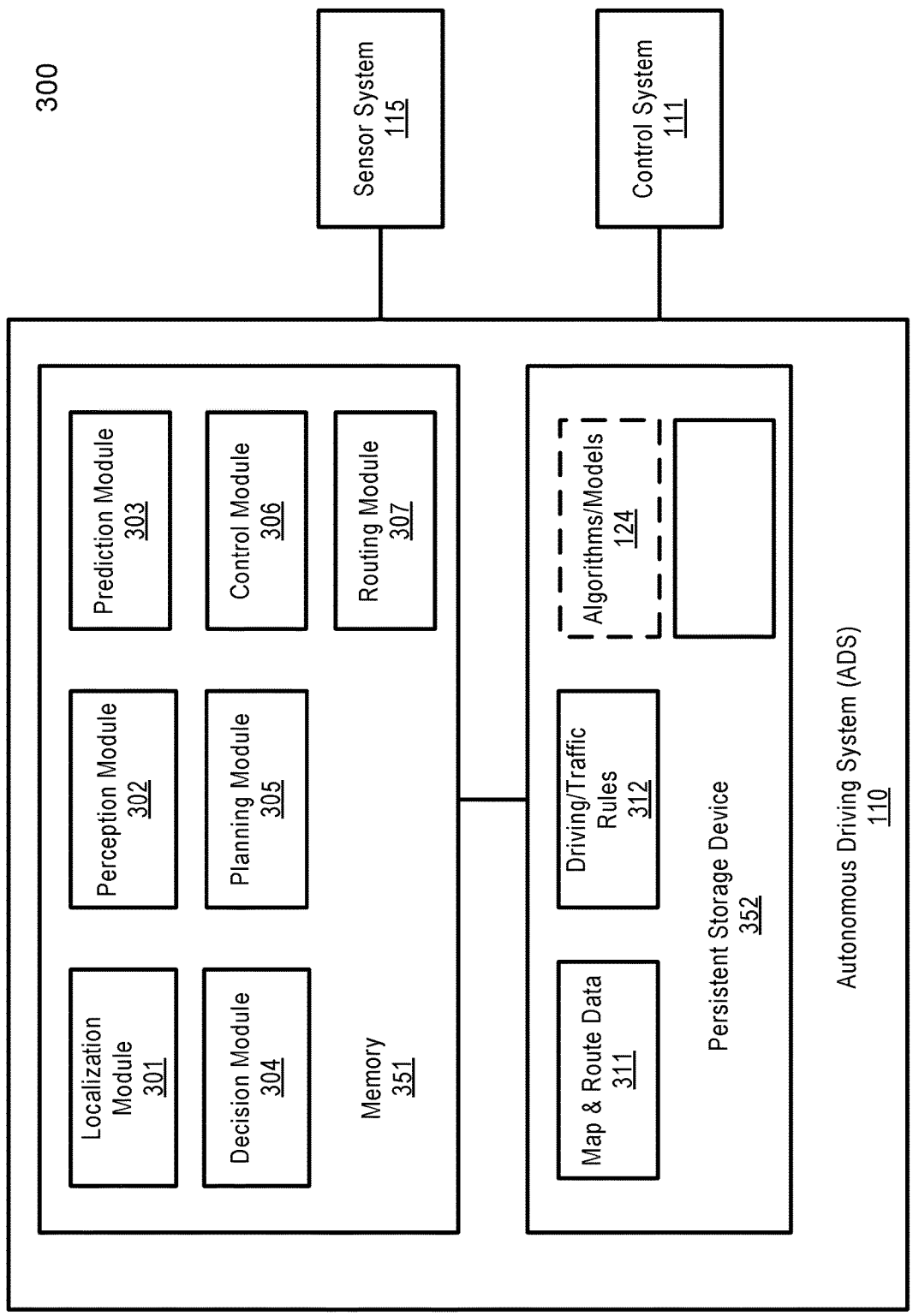
FIGS. 3A-3B are block diagrams illustrating an example of an autonomous driving system used with an autonomous driving vehicle according to one embodiment.
Figure 3B:
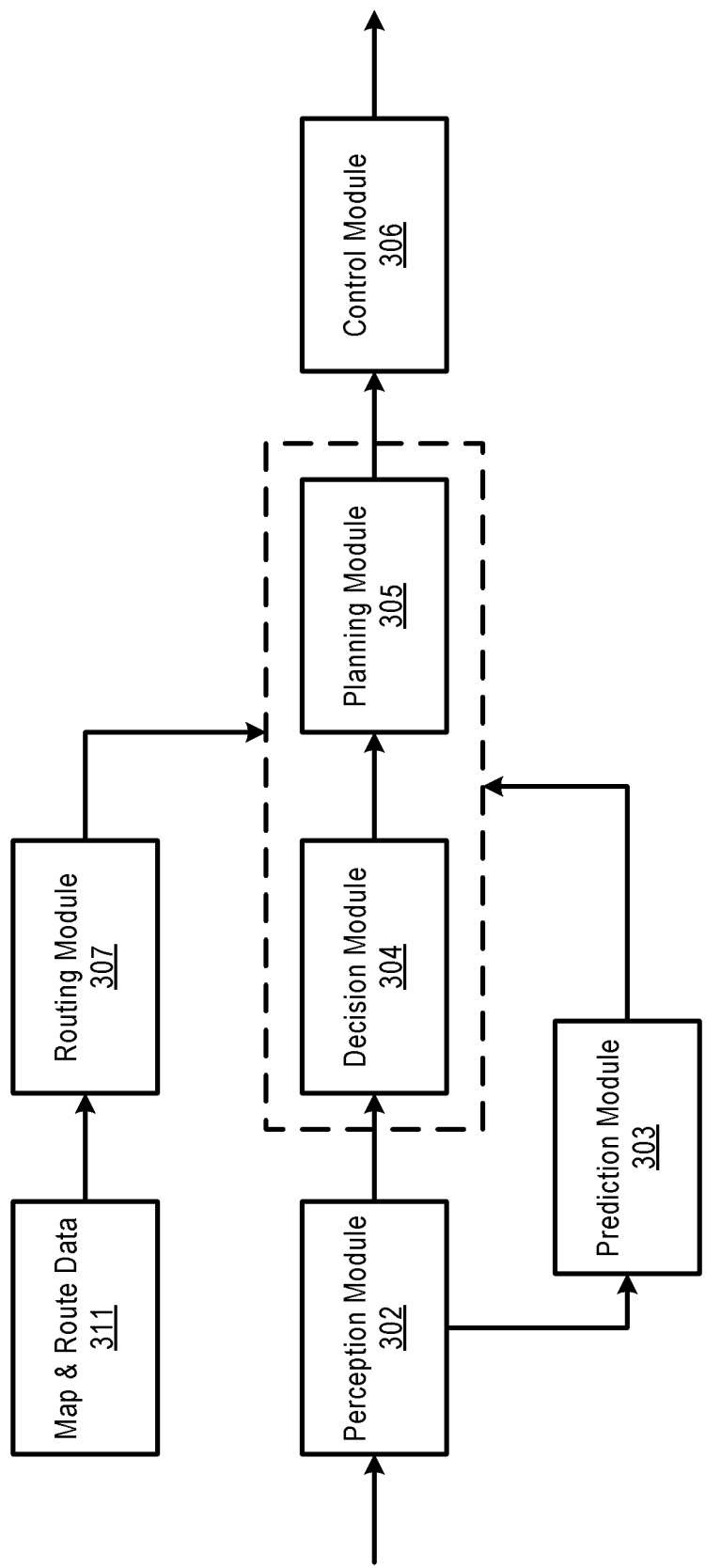

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line.

The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 101 would move in a next moving cycle (e.g., next route/path segment). For example, the planning and control data may instruct vehicle 101 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 4:
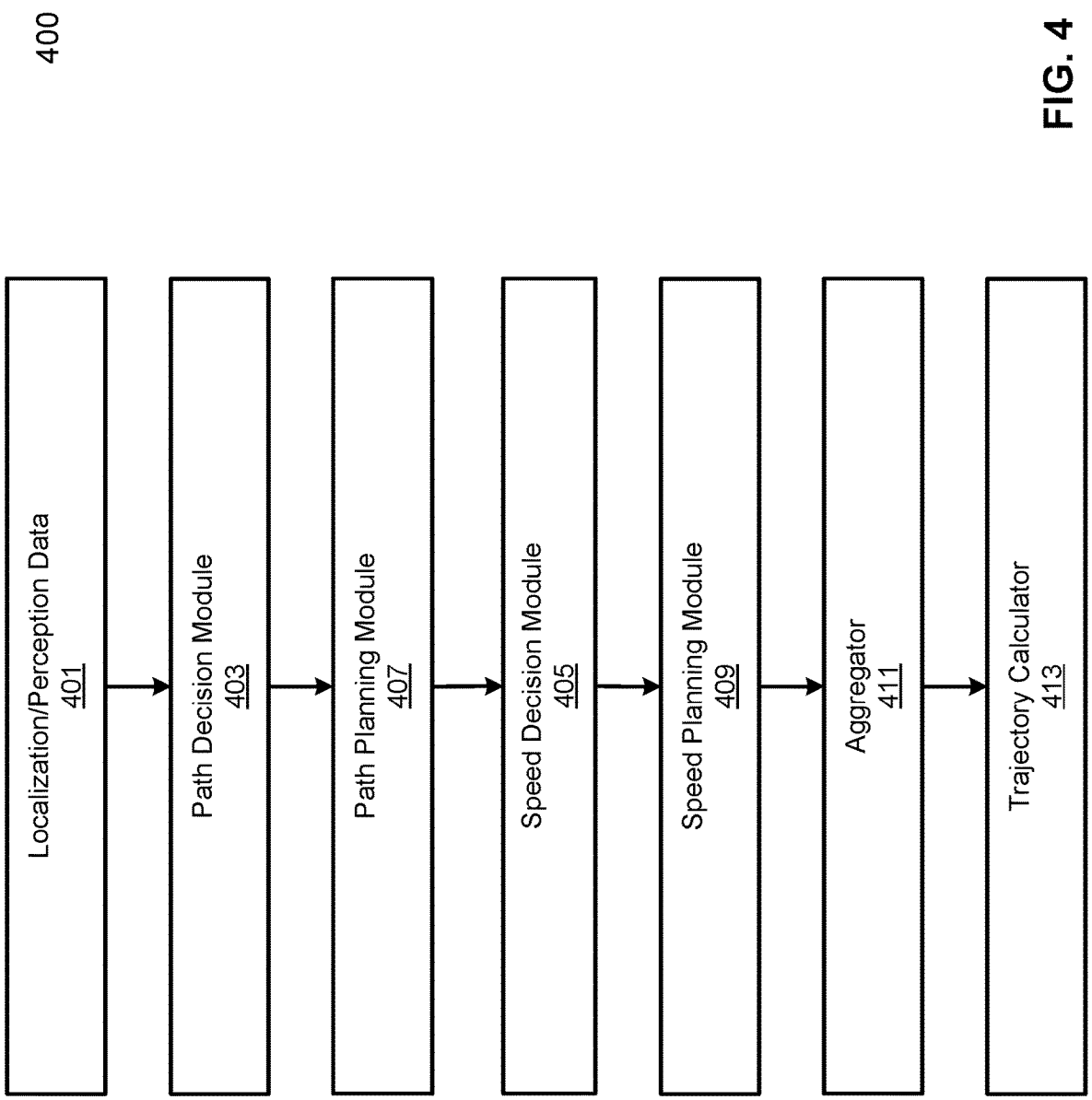
FIG. 4 is a block diagram illustrating an example of a decision and planning system according to one embodiment.

FIG. 4 is a block diagram illustrating an example of a decision and planning system according to one embodiment. System 400 may be implemented as part of autonomous driving system 300 of FIGS. 3A-3B to perform path planning and speed planning operations. Referring to FIG. 4, Decision and planning system 400 (also referred to as a planning and control or PnC system or module) includes, amongst others, routing module 307, localization/perception data 401, path decision module 403, speed decision module 405, path planning module 407, speed planning module 409, aggregator 411, and trajectory calculator 413.

Path decision module 403 and speed decision module 405 may be implemented as part of decision module 304. In one embodiment, path decision module 403 may include a path state machine, one or more path traffic rules, and a station-lateral maps generator. Path decision module 403 can generate a rough path profile as an initial constraint for the path/speed planning modules 407 and 409 using dynamic programming.

In one embodiment, the path state machine includes at least three states: a cruising state, a changing lane state, and/or an idle state. The path state machine provides previous planning results and important information such as whether the ADV is cruising or changing lanes. The path traffic rules, which may be part of driving/traffic rules 312 of FIG. 3A, include traffic rules that can affect the outcome of a path decisions module. For example, the path traffic rules can include traffic information such as construction traffic signs nearby the ADV can avoid lanes with such construction signs. From the states, traffic rules, reference line provided by routing module 307, and obstacles perceived by perception module 302 of the ADV, path decision module 403 can decide how the perceived obstacles are handled (i.e., ignore, overtake, yield, stop, pass), as part of a rough path profile.

For example, in one embedment, the rough path profile is generated by a cost function consisting of costs based on: a curvature of path and a distance from the reference line and/or reference points to obstacles. Points on the reference line are selected and are moved to the left or right of the reference lines as candidate movements representing path candidates. Each of the candidate movements has an associated cost. The associated costs for candidate movements of one or more points on the reference line can be solved using dynamic programming for an optimal cost sequentially, one point at a time.

In one embodiment, a state-lateral (SL) maps generator (not shown) generates an SL map as part of the rough path profile. An SL map is a two-dimensional geometric map (similar to an x-y coordinate plane) that includes obstacles information perceived by the ADV. From the SL map, path decision module 403 can lay out an ADV path that follows the obstacle decisions. Dynamic programming (also referred to as a dynamic optimization) is a mathematical optimization method that breaks down a problem to be solved into a sequence of value functions, solving each of these value functions just once and storing their solutions. The next time the same value function occurs, the previous computed solution is simply looked up saving computation time instead of recomputing its solution.

Speed decision module 405 or the speed decision module includes a speed state machine, speed traffic rules, and a station-time graphs generator (not shown). Speed decision process 405 or the speed decision module can generate a rough speed profile as an initial constraint for the path/speed planning modules 407 and 409 using dynamic programming. In one embodiment, the speed state machine includes at least two states: a speed-up state and/or a slow-down state. The speed traffic rules, which may be part of driving/traffic rules 312 of FIG. 3A, include traffic rules that can affect the outcome of a speed decisions module. For example, the speed traffic rules can include traffic information such as red/green traffic lights, another vehicle in a crossing route, etc. From a state of the speed state machine, speed traffic rules, rough path profile/SL map generated by decision module 403, and perceived obstacles, speed decision module 405 can generate a rough speed profile to control when to speed up and/or slow down the ADV. The SL graphs generator can generate a station-time (ST) graph as part of the rough speed profile.

In one embodiment, path planning module 407 includes one or more SL maps, a geometry smoother, and a path costs module (not shown). The SL maps can include the station-lateral maps generated by the SL maps generator of path decision module 403. Path planning module 407 can use a rough path profile (e.g., a station-lateral map) as the initial constraint to recalculate an optimal reference line using quadratic programming. Quadratic programming (QP) involves minimizing or maximizing an objective function (e.g., a quadratic function with several variables) subject to bounds, linear equality, and inequality constraints.

One difference between dynamic programming and quadratic programming is that quadratic programming optimizes all candidate movements for all points on the reference line at once. The geometry smoother can apply a smoothing algorithm (such as B-spline or regression) to the output station-lateral map. The path costs module can recalculate a reference line with a path cost function, to optimize a total cost for candidate movements for reference points, for example, using QP optimization performed by a QP module (not shown). For example, in one embodiment, a total path cost function can be defined as follows:

$$\text{path cost} = \Sigma_{points}(\text{heading})^2 + \Sigma_{points}(\text{curvature})^2 + \Sigma_{points}(\text{distance})^2,$$

where the path costs are summed over all points on the reference line, heading denotes a difference in radial angles (e.g., directions) between the point with respect to the reference line, curvature denotes a difference between curvature of a curve formed by these points with respect to the reference line for that point, and distance denotes a lateral (perpendicular to the direction of the reference line) distance from the point to the reference line. In some embodiments, distance represents the distance from the point to a destination location or an intermediate point of the reference line. In another embodiment, the curvature cost is a change between curvature values of the curve formed at adjacent points. Note the points on the reference line can be selected as points with equal distances from adjacent points. Based on the path cost, the path costs module can recalculate a reference line by minimizing the path cost using quadratic programming optimization, for example, by the QP module.

Speed planning module 409 includes station-time graphs, a sequence smoother, and a speed costs module. The station-time graphs can include a ST graph generated by the ST graphs generator of speed decision module 405. Speed planning module 409 can use a rough speed profile (e.g., a station-time graph) and results from path planning module 407 as initial constraints to calculate an optimal station-time curve. The sequence smoother can apply a smoothing algorithm (such as B-spline or regression) to the time sequence of points. The speed costs module can recalculate the ST graph with a speed cost function to optimize a total cost for movement candidates (e.g., speed up/slow down) at different points in time.

For example, in one embodiment, a total speed cost function can be:

$$\text{speed cost} = \Sigma_{points}(\text{speed}')^2 + \Sigma_{points}(\text{speed}'')^2 + (\text{distance})^2,$$

where the speed costs are summed over all time progression points, speed' denotes an acceleration value or a cost to change speed between two adjacent points, speed" denotes a jerk value, or a derivative of the acceleration value or a cost to change the acceleration between two adjacent points, and distance denotes a distance from the ST point to the destination location. Here, the speed costs module calculates a station-time graph by minimizing the speed cost using quadratic programming optimization, for example, by the QP module.

Aggregator 411 performs the function of aggregating the path and speed planning results. For example, in one embodiment, aggregator 411 can combine the two-dimensional ST graph and SL map into a three-dimensional SLT graph. In another embodiment, aggregator 411 can interpolate (or fill in additional points) based on two consecutive points on an SL reference line or ST curve. In another embodiment, aggregator 411 can translate reference points from (S, L) coordinates to (x, y) coordinates. Trajectory generator 413 can calculate the final trajectory to control ADV 101. For example, based on the SLT graph provided by aggregator 411, trajectory generator 413 calculates a list of (x, y, T) points indicating at what time should the ADC pass a particular (x, y) coordinate.

Thus, path decision module 403 and speed decision module 405 are configured to generate a rough path profile and a rough speed profile taking into consideration obstacles and/or traffic conditions. Given all the path and speed decisions regarding the obstacles, path planning module 407 and speed planning module 409 are to optimize the rough path profile and the rough speed profile in view of the obstacles using QP programming to generate an optimal trajectory with minimum path cost and/or speed cost.

Dynamic Scenario Parameters

Figure 5:
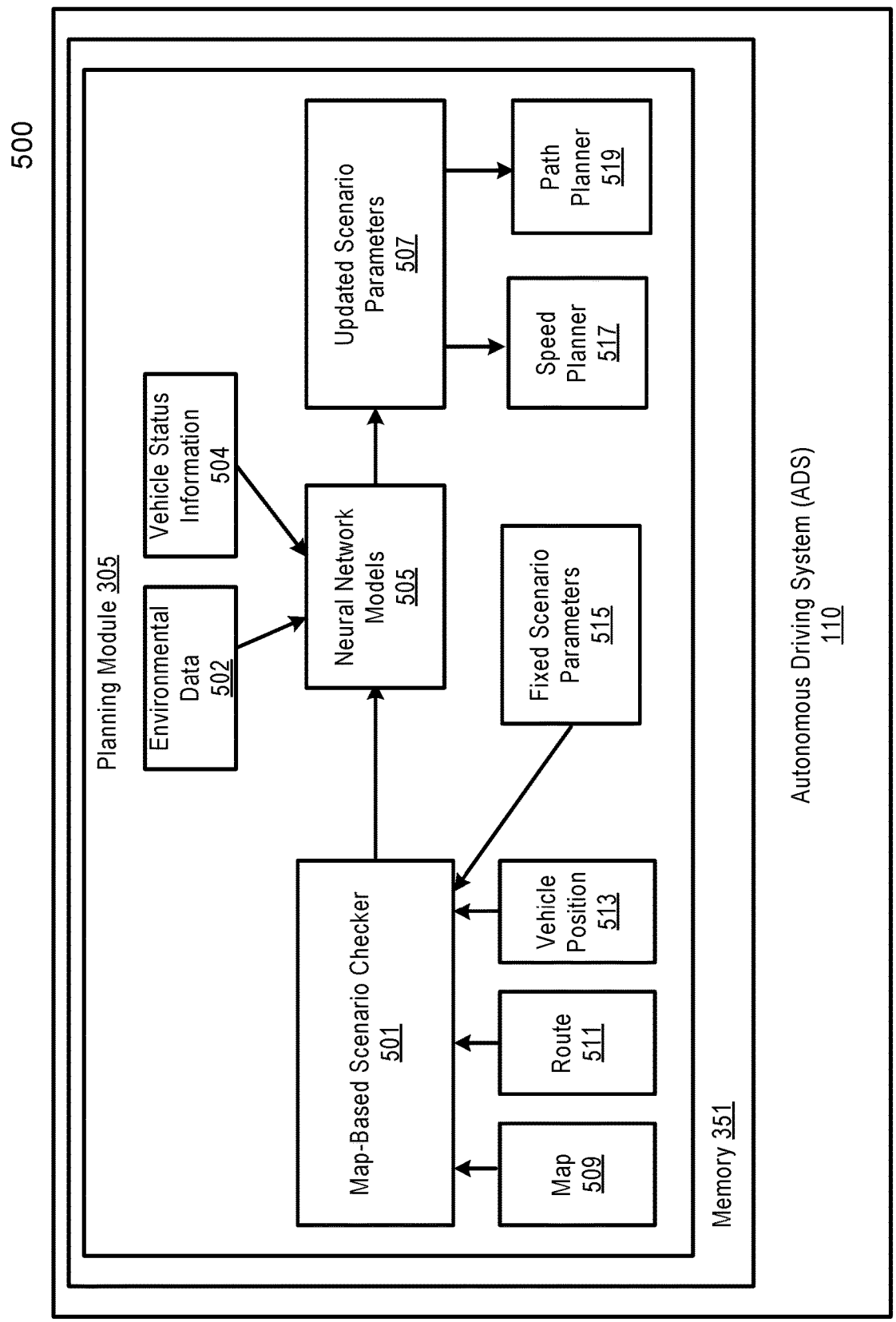
FIG. 5 illustrates the planning module for dynamically generating scenario parameters according to an embodiment.

FIG. 5 illustrates the planning module 305 for generating scenario parameters according to an embodiment.

As shown in FIG. 5, the planning module 305 can include multiple neural network models 505, each of which corresponds to one of many predefined scenarios. Each scenario is a driving environment determined based on map information. For example, the predefined scenarios can include a junction, a yield sign, a stop sign, a one-lane right turn, a one-lane left turn, a multi-lane right turn, and a multi-lane left turn.

Each scenario can be associated with a different set of parameters, which can be used to specify a boundary of the scenario and to specify how the ADV is expected to behave after entering the scenario.

For example, for the junction scenario, the boundary parameter can be 12 meter from the traffic lights in the scenario, meaning that the ADV is considered to have entered the junction scenario when the distance of the ADV to the traffic lights is less than 12 meters. Still using the junction scenario as an example, the parameters for specifying the behaviors of the ADV in the scenario can include the speed of the ADV, the acceleration of the ADV, the point of time when it will slow down, and the point of tie when it will speed up, and the turning angle of the steering wheel.

The set of parameters for each predetermined scenario can be fixed regardless of the location of the scenario, and the time of the day when the ADV enters the scenario. For example, if the boundary of the junction is defined to be 12 meters or less from the traffic lights, the planning module 305 of the ADV 101 will consider the ADV to have entered the scenario when the ADV is 12 meter or less from the traffic lights in the junction, and will operate according to the fixed parameters of the scenario, no matter on which or road or when (e.g., during rush hours or non-rush hours) the ADV encounters a junction scenario.

As shown in FIG. 5, fixed scenario parameters 515 represents multiple sets of fixed scenario parameters for the multiple predefined scenarios for the ADV 101. The set of fixed scenario parameters for each predefined scenario can be generated by one of the multiple neural network models 505, which are trained based training data collected from human-driven vehicles navigating that scenario.

In one embodiment, the set of fixed scenario parameters for a particular type of scenario can be the default parameters for the ADV when entering such a scenario if the default set of scenario parameters are not overwritten or updated.

The set of fixed parameters for a scenario can be generated by a neural network model corresponding to the scenario. The neural network model can be trained using historical vehicle status information and environmental conditions extracted from record files generated by multiple human-driven vehicles that have navigated multiple such scenarios at different locations and at different times of the day. In one embodiment, the training data can be obtained from the driving statistics collected by the data collector 121 as described in FIG. 1. The corresponding neural network model thus can generate a set of parameters that mimic what a typical human being would do when navigating the scenario.

As further shown in FIG. 5, the planning module 315 can include a map-based scenario checker 501, which can determine which scenario that the ADV has entered based on map information 509, route information 511, and a position of the vehicle 513 as well as one or more fixed scenario parameters (e.g., boundary information) of each set of fixed scenario parameters in the fixed scenario parameters 515.

In one embodiment, the map-based scenario checker 501 can be a convolutional neural network (CNN) model or another type of neural network models trained to classify different types of scenarios, and to determine whether the ADV 101 is in a particular scenario based on the vehicle position 513 and the boundary parameter of the scenario.

Once the planning module 315 determines that it has entered a particular scenario, the planning module 315 can select a trained neural network model for the determined scenario from all the available neural network models 505. The selected neural network model can then be used to generate a set of updated scenario parameters 507 based on current environmental data 502 at the scenario and current vehicle status information 504 of the ADV 101. The set of updated scenario parameters 507 can be used by a speed planner 517 and a path planner 519 in the planning module to plan a trajectory to navigate the scenario. The speed planner 517 performs the same functions as the speed decision module 405 described in FIG. 4, and the path planner 519 performs the same functions as the path planning module 407 described in FIG. 4. The set of updated scenario parameters 507 can serve as additional constraints used by the planning module 305 when generating a planned trajectory.

For example, the fixed scenario parameters for a junction has a 12 meter to the traffic lights in the scenario as the boundary parameter. When the ADV enters a junction scenario during rush hours, however, the planning module 305 can invoke the corresponding neural network model to adjust the default boundary parameter of 12 meters and one or more other predefined fixed parameters for the scenario. Since this is during rush hours, the ADV may adjust the boundary parameter to 10 meters, meaning that the ADV 101 will prepare to enter a junction driving mode earlier to get ready for the complexity of the junction due to heavier than normal traffics.

Thus, while the set of fixed scenario parameters reflect how a typical human being would drive to navigate a particular scenario based on historical driving statistics regardless of the location of the scenario and the time of entering the scenario, the set of updated scenario parameters reflect how a human driver would drive at a specific scenario based on the specific environmental conditions of the scenario and the status information of the vehicle at the scenario.

Figure 6:
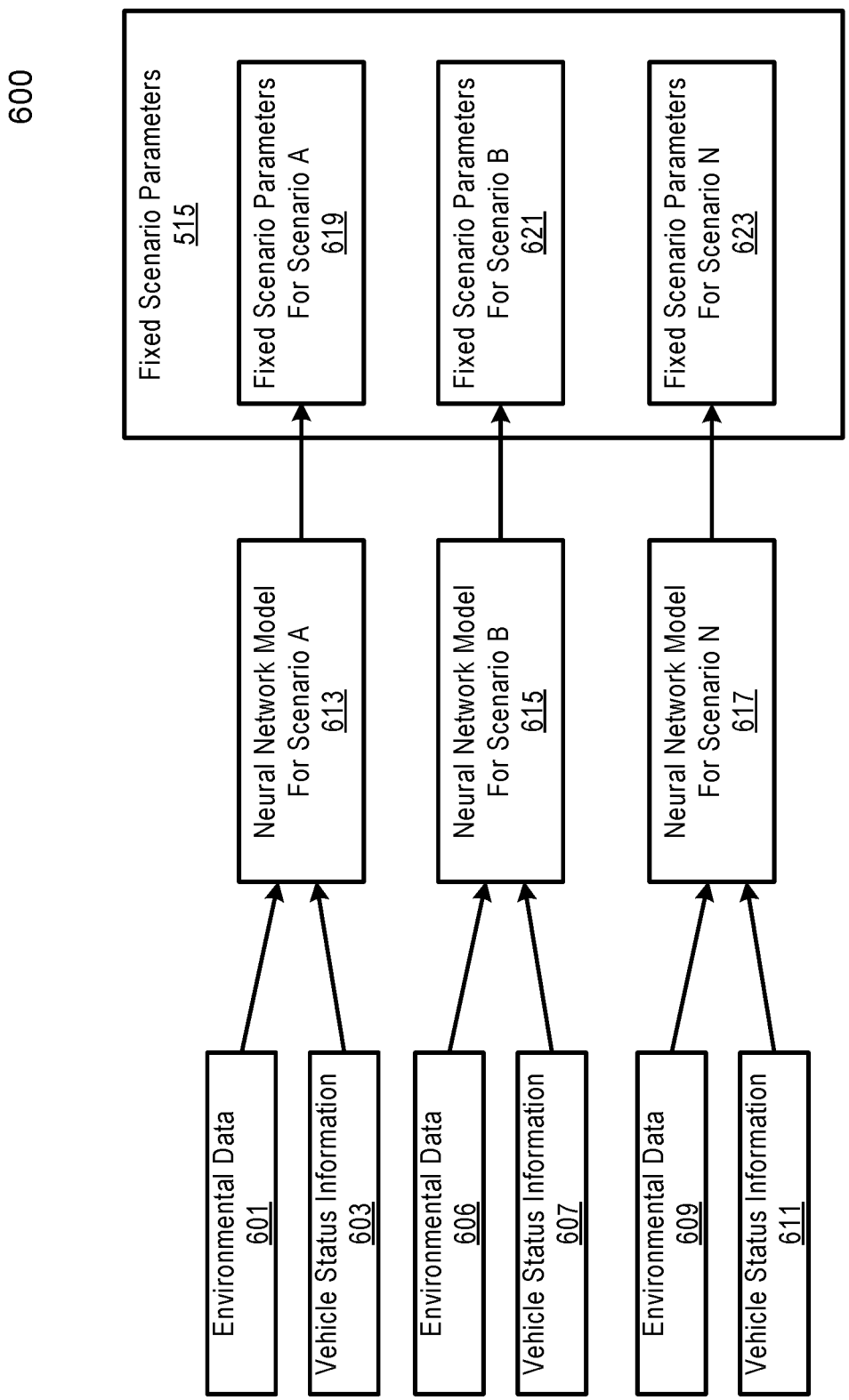
FIG. 6 illustrates shows how the fixed scenario parameters are generated according to one embodiment.

FIG. 6 illustrates shows how the fixed scenario parameters 515 are generated according to one embodiment.

As shown in FIG. 6, multiple neural network models 613, 615, and 617 for different types of predefined scenarios can be provided in the planning module 305. Each of the neural network models can be a multi-layer perceptron (MLP), and can have a different number of layers. But each of the neural network model can take the same type of input, i.e., environmental data 601, 606, and 609, and vehicle status information 603, 607, and 611.

In one embodiment, each neural network model can be trained using driving statistics collected from a variety of vehicles that are driven by human drivers. Each of the vehicle status information 603, 607, and 611 can include information indicating the driving commands (e.g., throttle, brake, steering commands) issued and responses of the vehicles (e.g., speeds, accelerations, decelerations, directions) captured by sensors of the vehicles at different points in time when navigating the corresponding scenario. Each of the environmental data 601, 606, and 609 can include information describing the driving environments at different points in time, such as, for example, routes (including starting and destination locations), MPOIs, road conditions, weather conditions, etc.

As shown in FIG. 6, the neural network models can generate a set of fixed scenario parameters for each of the predefined scenarios 619, 621, and 623.

Figure 7:
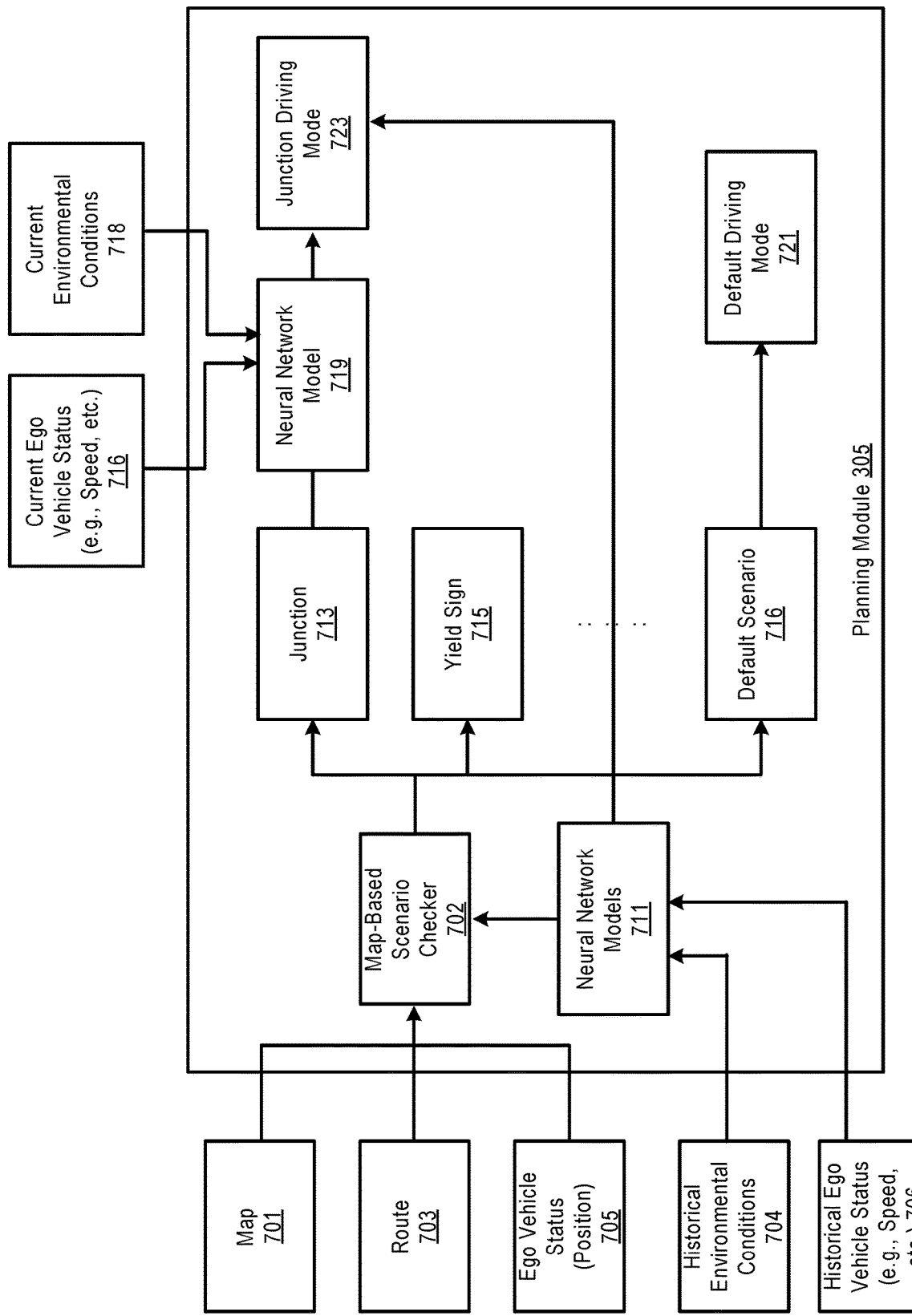
FIG. 7 shows the planning module according to another embodiment.

FIG. 7 shows the planning module 305 according to another embodiment. More specifically, the figure shows a comprehensive process by which the planning module 305 generates a set of updated scenario parameters in real-time when the ADV 101 enters a new scenario.

In one embodiment, the planning module 305 can invoke a map-based scenario checker 702 (the same component as the map-based scenario checker 501 described in FIG. 5) each planning cycle to determine whether the ADV 101 has entered a particular scenario based on map information 701, route information 703, and ego vehicle status information (e.g. position) 705. In making such a decision, the map-based scenario checker 702 may also use one or more scenario parameters (e.g., a scenario boundary) generated by a corresponding neural network model in multiple models 711 based on historical environmental conditions 704 and historical ego vehicle status 706.

As shown in FIG. 7, the map-based scenario checker 702 may check whether the ADV 101 has entered one of multiple predetermined scenarios for the ADV 101. Examples of the predefined scenarios may include a junction 713, a yield sign 715, and many other commonly seen scenarios on a map, such as a left turn, right turn, and a stop sign. In addition, the predefined scenario may include a default scenario 716, which may represent any undefined scenario for the ADV 101.

FIG. 7 shows that the planning module 305 has determined that the ADV 101 has entered the junction scenario 713. In such a case, the planning module 305 can invoke a neutral network model 719, which takes current ego vehicle status information and current environmental conditions as input to generate a set of updated scenario parameters. The set of updated scenario parameters can partially or completely replace the set of fixed scenario parameters generated for the junction scenario 713, and can be used by the planning module 305 to configure the ADV 101 to drive in a junction driving mode 723.

In one embodiment, the junction driving mode 723 can be defined by a set of driving commands that reflect how a human driver would operate the ADV 101 at the junction 713 in light of the real-time environmental conditions 718 of the junction driving mode 723 and the real-time vehicle status (e.g., speed) 716.

In one embodiment, if the planning module 305 cannot determine what type of scenario the ADV 101 is in, the ADV 101 would determine that it is driving a default scenario 716. As with other predefined scenarios, the default scenario 716 also has a set of fixed scenario parameters generated by a corresponding neural network model, which can also update the set of fixed scenario parameters based real-time environmental conditions and vehicle status information at the default scenario 716 to configure the ADV 101 to drive in a default driving mode 721.

In one embodiment, the neural network model for generating the fixed scenario parameters and the neural network model for generating the updated scenario parameters for each scenario can be the same neural network model or they can be different neural network models in terms of the number of hidden layers and the type of neural network models.

Figure 8:
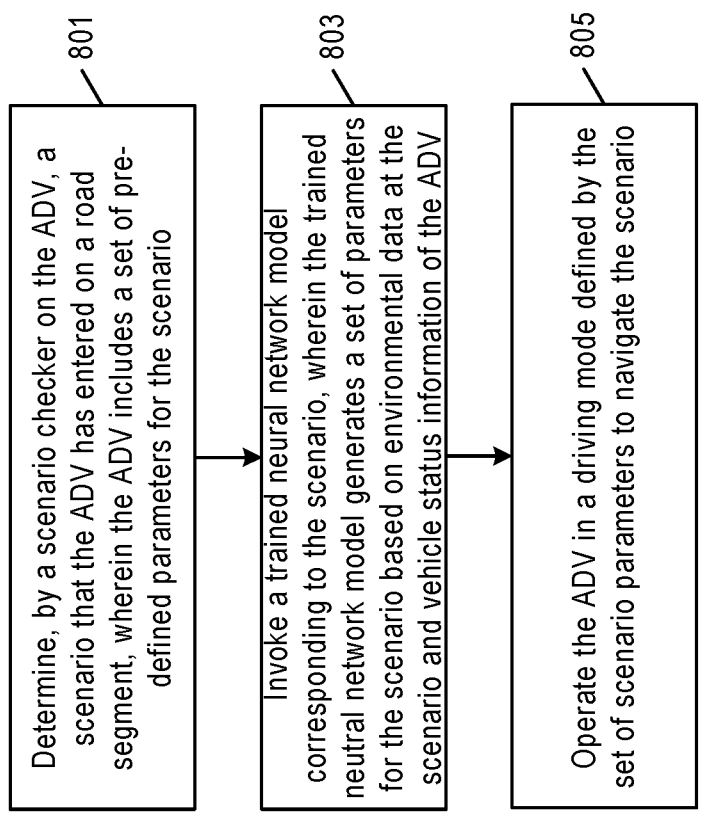
FIG. 8 is a flow chart illustrating a process of operating an ADV according to one embodiment.

FIG. 8 is a flow chart illustrating a process of operating an ADV according to one embodiment. The process may be performed by processing logic which may include software, hardware, or a combination thereof. For example, the process may be performed by the planning module 305 described in FIG. 5.

Referring to FIG. 8, in operation 801, the processing logic determines a scenario that the ADV has entered a road segment. The ADV can makes a such a determination based map information, route information, and position information of the ADV as well as at least a boundary parameters of a set of fixed parameters for the scenario.

In operation 803, the processing logic invokes a trained neural network model corresponding to the scenario to generate a set of updated parameters for the scenario based on environmental data at the scenario and vehicle status information of the ADV. The environmental data is real-time data related to the environment of the scenario, and the vehicle status information of the ADV includes the speed of the ADV, the heading of the ADV, the deceleration of the ADV, the acceleration of the ADV, and various control commands of the ADV.

In operation 805, the processing logic operates the ADV in a driving mode defined by the set of scenario parameters to navigate the scenario. The driving mode mimics a human driver's driving behavior when navigating the scenario, and is defined by the set of updated parameters. For example, the set of updated parameters for a right turn scenario can include a time when the ADV is to slow down to a particular speed, when to cruise again, and when to make a right turn, and the angle of the turning wheel.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of operating an autonomous driving vehicle (ADV), comprising:
   determining, by a scenario checker on the ADV, a scenario that the ADV has entered on a road segment based on a position of the ADV and a boundary parameter associated with a traffic signal in the road segment;
   invoking, by the ADV, a trained neural network model corresponding to the scenario determined by the scenario checker;
   generating, with the trained neural network model corresponding to the scenario determined by the scenario checker, a set of parameters based on environmental data at the scenario and vehicle status information of the ADV, the set of parameters for the scenario replacing a set of fixed scenario parameters of the trained neural network model, wherein the set of fixed scenario parameters are based on training data collected from human-driven vehicles navigating a similar scenario as the scenario determined by the scenario checker; and
   operating the ADV in a driving mode defined by the set of parameters generated based on the environmental data at the scenario and the vehicle status information of the ADV to navigate the scenario.

2. The computer-implemented method of claim 1, wherein the scenario checker determines the scenario that the ADV has entered based on a current position of the ADV, information on a map surrounding the current position, information of a route that the ADV is taking, and one or more of the set of fixed scenario parameters.

3. The computer-implemented method of claim 2, wherein the set of fixed scenario parameters are generated by the trained neural network model based on historical environmental data and historical vehicle status information.

4. The computer-implemented method of claim 1, wherein the environmental data at the scenario includes traffics at the scenario, and wherein the vehicle status information of the ADV includes a speed of the ADV.

5. The computer-implemented method of claim 1, wherein the set of scenario parameters represents a set of additional constraints that are used by the ADV when generating a planned trajectory.

6. The computer-implemented method of claim 1, wherein the scenario checker on the ADV is a convolutional neural network (CNN).

7. The computer-implemented method of claim 1, wherein the scenario is one of a plurality of scenarios that are predefined based on map information, wherein the plurality of scenarios include a junction, a yield sign, a stop sign, a one-lane right turn, a one-lane left turn, a multi-lane right turn, and a multi-lane left turn.

8. A non-transitory machine-readable medium having instructions stored therein, which when executed by a processor, cause the processor to perform operations for operating an autonomous driving vehicle (ADV), the operations comprising:
   determining a scenario, by a scenario checker, that the ADV has entered on a road segment based on a position of the ADV and a boundary parameter associated with a traffic signal in the road segment;
   invoking a trained neural network model corresponding to the scenario;
   generating, with the trained neural network model corresponding to the scenario, a set of parameters based on environmental data at the scenario and vehicle status information of the ADV, the set of parameters for the scenario replacing a set of fixed scenario parameters of the trained neural network model, wherein the set of fixed scenario parameters are based on training data collected from human-driven vehicles navigating a similar scenario as the scenario; and
   operating the ADV in a driving mode defined by the set of parameters generated based on the environmental data at the scenario and the vehicle status information of the ADV to navigate the scenario.

9. The non-transitory machine-readable medium of claim 8, wherein the determining that the ADV has entered is based on a current position of the ADV, information on a map surrounding the current position, information of a route that the ADV is taking, and one or more of the set of fixed scenario parameters.

10. The non-transitory machine-readable medium of claim 9, wherein the set of fixed scenario parameters are generated by the trained neural network model based on historical environmental data and historical vehicle status information.

11. The non-transitory machine-readable medium of claim 8, wherein the environmental data at the scenario includes traffics at the scenario, and wherein the vehicle status information of the ADV includes a speed of the ADV.

12. The non-transitory machine-readable medium of claim 8, wherein the set of scenario parameters represent a set of additional constraints that are used by the ADV when generating a planned trajectory.

13. The non-transitory machine-readable medium of claim 8, wherein the scenario checker on the ADV is a convolutional neural network (CNN).

14. The non-transitory machine-readable medium of claim 8, wherein the scenario is one of a plurality of scenarios that are predefined based on map information, wherein the plurality of scenarios include a junction, a yield sign, a stop sign, a one-lane right turn, a one-lane left turn, a multi-lane right turn, and a multi-lane left turn.

15. A data processing system, comprising:
   a processor; and
   a memory coupled to the processor to store instructions, which when executed by the processor, cause the processor to perform operations of operating an autonomous driving vehicle (ADV), the operations comprising:
   determining a scenario, by a scenario checker, that the ADV has entered on a road segment based on a position of the ADV and a boundary parameter associated with a traffic signal in the road segment;
   invoking a trained neural network model corresponding to the scenario;

generating, with the trained neural network model corresponding to the determined scenario, a set of parameters based on environmental data at the scenario and vehicle status information of the ADV, the set of parameters for the scenario replacing a set of fixed scenario parameters of the trained neural network model, wherein the set of fixed scenario parameters are based on training data collected from human-driven vehicles navigating a similar scenario as the scenario determined by the scenario checker; and operating the ADV in a driving mode defined by the set of parameters generated based on the environmental data and the vehicle status information to navigate the scenario.

16. The data processing system of claim 15, wherein the determining that the ADV has entered is based on a current position of the ADV, information on a map surrounding the current position, information of a route that the ADV is taking, and one or more of the set of fixed scenario parameters.

17. The data processing system of claim 16, wherein the set of fixed scenario parameters are generated by the trained neural network model based on historical environmental data and historical vehicle status information.

18. The data processing system of claim 15, wherein the environmental data at the scenario includes traffics at the scenario, and wherein the vehicle status information of the ADV includes a speed of the ADV.

19. The data processing system of claim 15, wherein the set of scenario parameters represent a set of additional constraints that are used by a planning module when generating a planned trajectory.

20. The data processing system of claim 15, wherein the scenario checker on the ADV is a convolutional neural network (CNN).

* * * * *